United States Patent
Meya et al.

(10) Patent No.: US 6,279,734 B1
(45) Date of Patent: Aug. 28, 2001

(54) CHAIN DRUM ARRANGEMENT

(75) Inventors: Hans Meya, Werne; Gerhard Merten, Lünen, both of (DE)

(73) Assignee: DBT Deutsche Bergbau-Technik GmbH (DE)

( * ) Notice: Subject to any disclaimer, the term of this patent is extended or adjusted under 35 U.S.C. 154(b) by 0 days.

(21) Appl. No.: 09/400,566

(22) Filed: Sep. 21, 1999

(30) Foreign Application Priority Data

Oct. 2, 1998 (DE) .............................................. 198 45 432

(51) Int. Cl.⁷ .................................................. B65G 23/06
(52) U.S. Cl. .............................................................. 198/834
(58) Field of Search ........................... 198/834; 474/903, 474/156, 164

(56) References Cited

U.S. PATENT DOCUMENTS

| | | | |
|---|---|---|---|
| 2,965,217 | * 12/1960 | Dommann et al. | 198/834 |
| 3,805,631 | * 4/1974 | Kerklies | 198/834 |
| 4,037,713 | * 7/1977 | Soliman et al. | 198/834 |
| 4,437,564 | * 3/1984 | Redder et al. | 198/834 |
| 5,913,403 | * 6/1999 | Merten et al. | 198/834 |
| 5,947,265 | * 9/1999 | Merten et al. | 198/834 |

FOREIGN PATENT DOCUMENTS

| | | |
|---|---|---|
| 1756355 | 4/1970 | (DE) . |
| 4204381 A1 | 8/1993 | (DE) . |
| 19547351 A1 | 6/1997 | (DE) . |

\* cited by examiner

*Primary Examiner*—Christopher P. Ellis
*Assistant Examiner*—Khoi H. Tran
(74) *Attorney, Agent, or Firm*—Samuels, Gauthier & Stevens

(57) ABSTRACT

A chain drum arrangement for a scraper-chain conveyor has a chain drum, which is connected at its end regions to two mutually aligned chain drum shafts mounted rotatably in a machine frame and, when uncoupled, can be removed from its fitted position transversely to its longitudinal axis from the machine frame. The chain drum shafts have terminal shaft journals projecting inwardly from side wall sections of the machine frame whereas the chain drum is provided, at its end regions, with substantially radially extending pockets with which it can be plugged onto the shaft journals and locked non-rotatably thereto The shaft journals are peripherally flattened to engage positively in the pockets and have external regions which act as locking claws fitting into undercut regions of the pockets when the drum is partly rotated around the journals. Closure members with screwed-on releasable locking plates serve to lock the drum on the journals.

16 Claims, 4 Drawing Sheets

CHAIN DRUM ARRANGEMENT

FIELD OF THE INVENTION

The invention relates to a chain drum arrangement for a drive and/or reversing station of a scraper-chain conveyor, used in particular in mining.

BACKGROUND OF THE INVENTION

Scraper-chain conveyors are frequently used, in particular, in mining as face or gate conveyors and also for debris haulage during tunnel driving. The scraper-chain assembly of the conveyor, typically designed as a centre-strand assembly, is driven continuously through one or two chains connected to spaced-apart scrapers moving along in upper and lower runs in the central region of the conveyor troughs or pans. The scraper-chain assembly is entrained around chain drums which are mounted in machine frames arranged on the conveyor troughs at the ends of the conveyor. The chain drum at the discharge end of the conveyor is usually driven by a main conveyor drive flanged laterally on the machine frame to form a drive station. At the other end of the conveyor, the drum forms a reversing station which can comprise a further (auxiliary) drive, but can frequently also be without a drive, in particular in the case of conveyors with relatively small lengths.

During operation, the chain drums of these arrangements are exposed to very high stresses and therefore wear rapidly. In particular, the sprocket wheels which mesh with the chain or chains wear very rapidly so it is necessary to design the chain drums in such a way that they can easily be removed and exchanged whenever necessary.

A known chain drum arrangement disclosed in DE-OS 42 04 381 has a chain drum which together with its short stub shaft, can be removed from the drive assembly after the release of screw bolts placed transversely through the shaft and holding the drum arrangement in the machine frame. With this arrangement, therefore, the chain drum is always exchanged together with its shaft, and this constructional unit is comparatively heavy and correspondingly difficult to handle. The arrangement has the further drawback that it necessitates time-consuming alterations if only the chain drum is to be replaced by a new one and the chain drum shaft with its bearing is to be retained.

With a chain drum arrangement known from DE-AS 1 756 355, the chain drum can also be removed together with its shaft and the rolling bearings arranged thereon from the machine frame. For this purpose, the rolling bearings are received in the machine with divided carrying rings. One ring half has to be dismantled and removed from each bearing before the drum arrangement can be exchanged. The use of divided carrying rings is disadvantageous in view of the high load stresses which tends to cause premature wear of the bearing carrying rings. The unit composed of the drum, shaft and bearings is also subject to the same disadvantages as described hereinbefore with respect to the high weight of the unit which is to be exchanged and the additional assembly cost for exchanging the bearings in the dismantled state of the chain drum.

DE-OS 195 47 351 discloses a drive station for scraper-chain conveyors with a chain drum coupled to two drive shafts mounted in the machine frame. The chain drum shafts are mounted axially displaceably in the machine frame. At their leading ends projecting from the machine frame, the shafts have teeth with which they engage in an internal bore, provided with mating internal teeth, at the respective end face of the chain drum. For unlocking, the chain drum shafts are displaced axially in the machine frame so that the shaft ends engaging in the chain drum during operation are removed from the internal bore and are moved back into the machine frame so the entire chain drum can then be removed from the machine frame transversely to its axis. Although this known arrangement allows very simple and quick exchange of the chain drum, the displaceable mounting of the chain drum shafts is comparatively complicated and therefore expensive and susceptible to breakdown.

SUMMARY OF THE INVENTION

It is an object of the invention to provide a chain drum arrangement which allows simple exchange of the single-part chain drum without the bearings and/or shafts of the arrangement having to be removed from the machine frame and with which the complicated axially displaceable mounting of the chain drum shafts can be dispensed with.

According to the invention there is provided a chain drum arrangement for a drive or reversing station of a scraper-chain conveyor, in particular for use in mining; said arrangement comprising a releasable chain drum which is connected at its end regions to two mutually aligned chain drum shafts mounted rotatably in a machine frame and, when uncoupled, can be removed from its fitted position in the machine frame or inserted into the fitted position transversely to its longitudinal axis; wherein the chain drum shafts have terminal shaft journals projecting inwardly from the machine frame and the chain drum is provided, at its end regions, with substantially radially extending plug-in elements with which it can be plugged onto the shaft journals and locked non-rotatably thereto.

In a particularly advantageous development of the invention, the plug-in elements are pockets which are open radially at least on the outside and into which the shaft journals engage during assembly and in which they are locked during operation of the conveyor.

It is particularly advantageous if the shaft journals are peripherally flattened and engage positively in the pockets. With this development of the invention, the shaft journals and the drum therefore form interengageable projection-and-recess elements with the pockets than acting as the associated recesses. In contrast to known designs these projections and recesses are not orientated parallel to the shaft axis as with shaft and hub joints but extend transversely thereto.

The pockets preferably possess undercut regions into which the shaft journals fit positively with their radially outer external regions forming locking claws after the chain drum has been plugged onto the shaft journal and rotated about a predetermined rotational angle. This connection between the chain drum shaft journal and the chain drum resembles a bayonet fitting and allows extremely rapid removal and installation of the drum because the positive connections between the shaft journals and chain drum is produced easily by moving the drum transversely to the axis of rotation and subsequent rotation about the set rotational angle, for example about approximately 60°. The chain drum can also be centred via the bayonet-type fitting, for which purpose the locking claws expediently have a curved external face whereas the undercut regions form segments of a circle of which the radius corresponds to the radius of curvature of the external faces of the locking claws. This design ensures that the chain drum rests without backlash and exactly centred on the shaft journal even after rotation about a small rotational angle.

The undercut regions advantageously form radially extending stop faces against which the locking claws rest with contact faces extending radially to the shaft axis after application and rotation of the chain drum. This design ensures that the torque between the chain drum and the chain drum shafts, which normally has to be transmitted only in one rotational direction of the chain drum, is transmitted only via the stop and contact faces, the plane of contact extending through the axis of rotation of the shafts or the drum so that the desirable load of a pure moment exists without additional eccentrically acting forces.

The chain drum can be arrested on the shaft journals by means of a suitable securing means, which does not transmit forces itself but serves merely to prevent unintentional rotation of the chain drum relative to the shaft journals and therefore undesirable release of the connection between the relative rotatable parts. Each shaft journal is expediently allocated a separate securing means which can consist essentially of a closure member inserted into the radial opening of the pocket associated with the journal. The securing means preferably rests on the flattened region of the respective shaft journal and, in the preferred embodiment of the invention, is accessible from the radial opening of the pocket when the chain drum is rotated on the shaft journal.

A particularly elegant solution is achieved if the closure member is provided with a locking projection with which it engages in a groove arranged in a lateral wall of the associated pocket and rests with an arresting face adapted to the flattened region of the respective shaft journal on the flattened region of the respective shaft journal. For final assembly of the connection between the chain drum and the relevant shaft journal, after application of the chain drum onto the shaft journal and the rotation thereof into its operating position, the closure member is passed in the radial opening of the pocket and inserted with its locking projection in the groove and is then tilted or pivoted round the locking projection until it rests with its arresting face on the flattened region of the shaft journal. In this position, the closure member can no longer be pulled radially from the opening of the pocket, and final securing necessitates only a simple holding element such as a screwed-on plate which prevents the closure member from pivoting back around the locking projection. Another form of securing means can be screwed directly on the shaft journal and/or on the chain drum in the locking position. However, it is particularly advantageous if the closure member, is secured in its locking position in the radial opening of the pocket by a screwed-on closure plate which prevents a tilting movement of the closure member. The closure plate can consist, for example, of an L-shaped angle profile, of which one arm rests, laterally on the closure member and the lateral wall of the pocket and of which the other arm is screwed to the radial exterior of the closure member. With this design, neither the chain drum nor the shaft journal are weakened by threaded holes which might otherwise be necessary for fastening the closure member. The L-shaped closure plate and the closure member constitute closure means with a total width which corresponds to the width of the radial opening of the pocket so the closure means cannot tilt into the pocket. Longitudinally movement of the closure means in the radial direction in the opening is prevented by the locking projection fitting in the groove.

In another aspect the invention provides a chain drum arrangement for use with a scraper-chain assembly for a scraper-chain conveyor, said arrangement comprising:

a chain drum with one or more toothed wheels for engaging with the scraper-chain assembly;

a pair of rotatable shafts with journals extending into the chain drum from opposite ends;

means for detachably connecting the chain drum to the journals and permitting the chain drum to be installed and removed from the arrangement by movement radially of the journals and part rotation relative to the journals in the manner of a bayonet fitting and selectively releasable means co-operating with the connecting means to prevent removal of the chain drum unless the releasable means has been operated and disabled.

The invention may be understood more readily, and various other features and advantages of the invention may become apparent, from consideration of the following description.

BRIEF DESCRIPTION OF DRAWINGS

An embodiment of the invention will now be described, by way of example only, with reference to the accompanying drawings wherein.

DESCRIPTION OF PREFERRED EMBODIMENT

Figure 1:
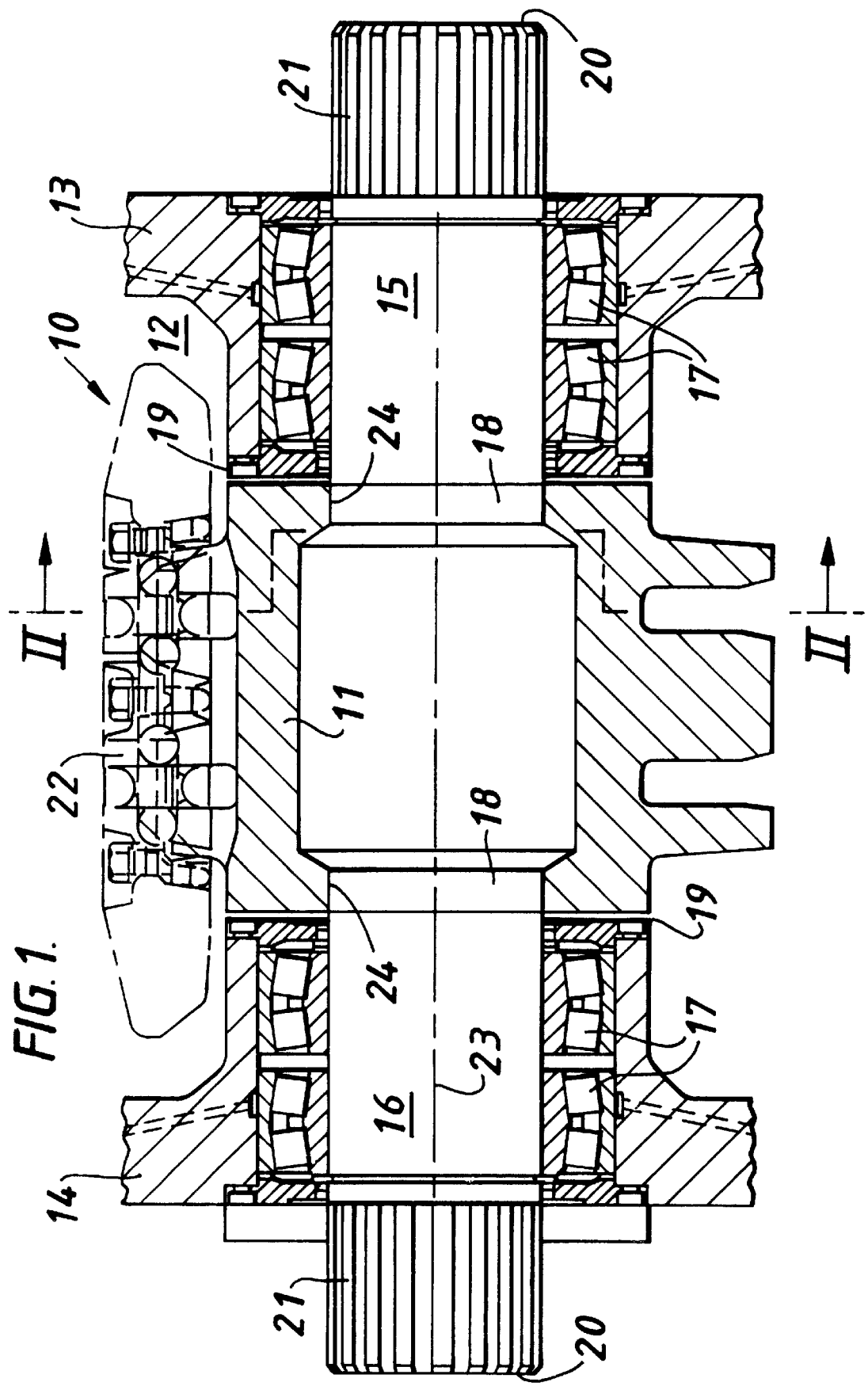
FIG. 1 is a section through a part of a drive station for a scraper-chain conveyor and incorporating a chain drum arrangement constructed in accordance with the invention and FIGS. 2 to 4 are sectional views taken along the line II—II of FIG. 1 and representing various stages during the installation of the chain drum, the view being on a somewhat enlarged scale compared to FIG. 1 and with the scraper-chain assembly omitted.

In FIG. 1, reference numeral 10 designates a chain drum arrangement for a drive station and/or reversing station of a scraper-chain conveyor constructed in accordance with the invention.

As is known, this type of conveyor is widely used in underground mining in a longwall face or gateway gallery to transport material after the mineral which is being won is detached form the mineral seam or face. The conveyor itself is composed of a series of channel section troughs or pans connected end-to-end and a scraper-chain assembly composed of a series of spaced-apart scrapers connected to chains circulated along the pans in upper and lower runs. The scraper-chain assembly is entrained around the chain drums as the ends of the series of pans. One or both of the chain drums is then driven to circulate the scraper-chain assembly. In a typical conveyor of this type one of the chain drums is incorporated with drive means into a drive station and the other of the drums is freely rotatable or driven by auxiliary drive means and is incorporated into a reversing station. The chain drum arrangement 10 can be used in either or both of these stations.

The chain drum arrangement 10 itself comprises a rotatable chain drum 11 which is arranged in a space 12 between two lateral sidewall sections 13, 14 of a machine frame of the station not shown in more detail. Two chain drum shafts 15, 16 are mounted in self-aligning roller bearings 17 in the side wall sections 13, 14. The shafts project with terminal shaft journals 18 into the space 12 and are connected there to the end regions 19 of the chain drum 11. At their other end regions 20 remote from the drum 11, the chain drum shafts 15,16 are provided in a manner known per se with multi-groove or splined profiles 21. One or both end regions 20 can be drivable connection to the output of a drive unit which drives the shafts 15,16 and the chain drum 11 into rotation As represented, the drum 11 has sets of sprocket teeth which interengage with a pair of chains at the centre of the scraper-chain assembly 22. The chain-dotted line at the upper part of the drum 11 in FIG. 1 shows one of the scrapers of the scraper-chain assembly.

Since the chain drum 11 is subjected to pronounced wear during operation of the conveyor the drum 11 is therefore designed as an interchangeable component which can be removed from its illustrated fitted position transversely to the axis 23 of the drum when aligned with the axes of the drum shafts 15, 16—from the machine frame and exchanged for a new replacement component. For this purpose, and according to the invention, radially extending plug-in elements 24 are provided at the end faces 19 of the chain drum 11 with which the chain drum 11 can be plugged radially, that is in a direction transversely to the longitudinal axis 23, directly onto the shaft journals 18 projecting into the space 12 between the sidewall sections 13, 14. When installed the elements 24 are locked non-rotatably to the journals 18. When the drum 11 is to be dismantled and replaced the elements 24 are unlocked from the shaft journals 18.

Figure 2:
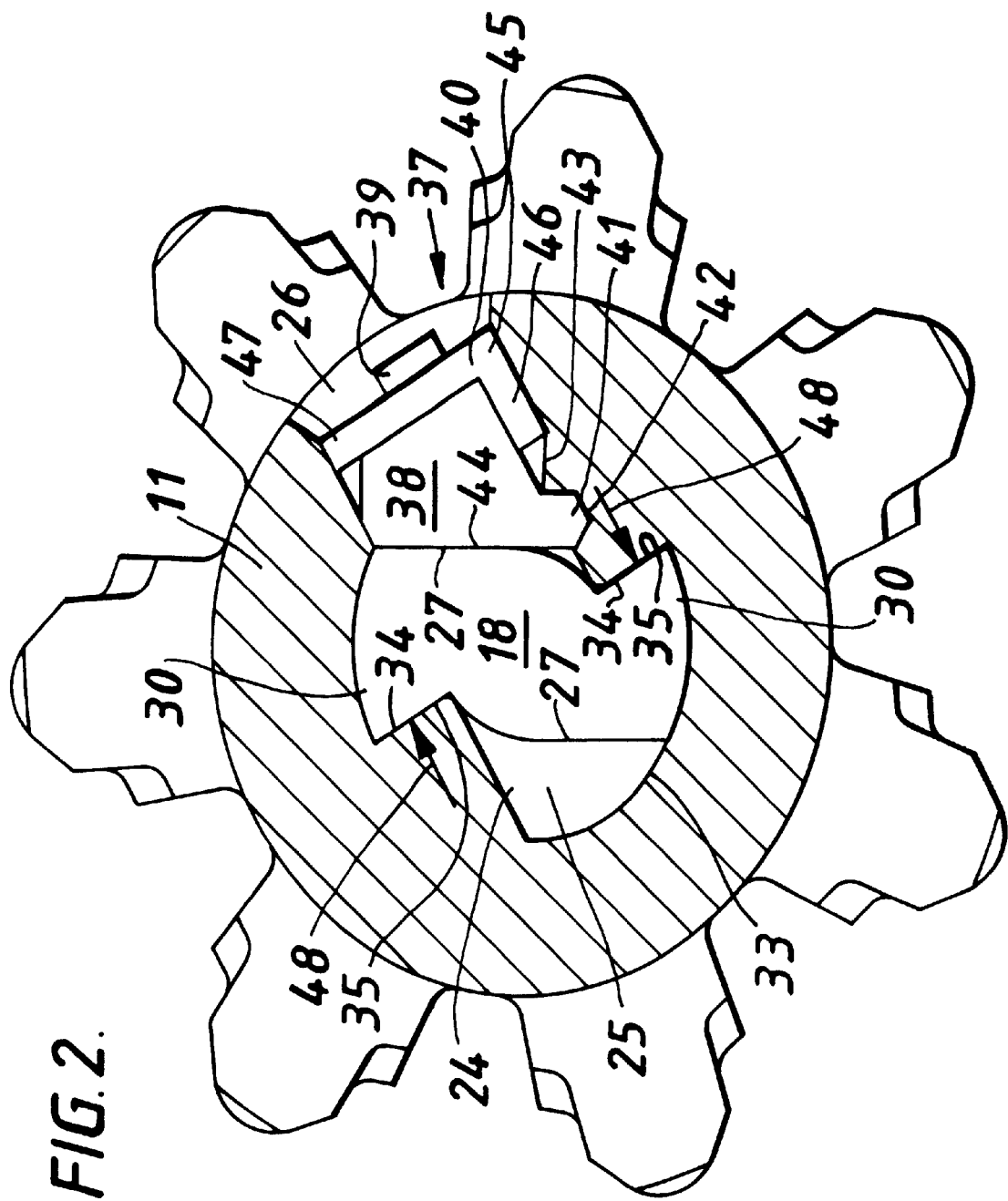
Figure 3:
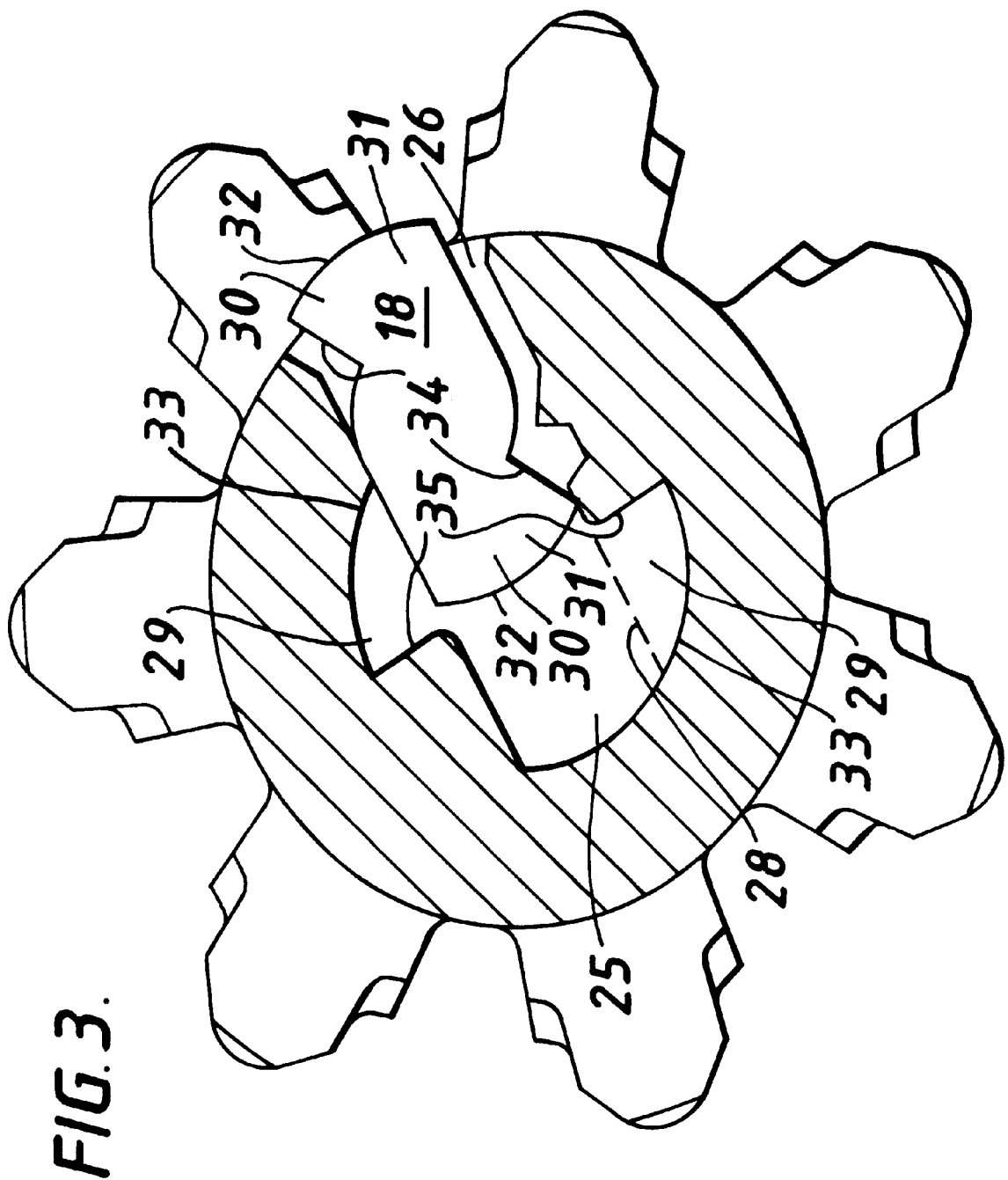
Figure 4:
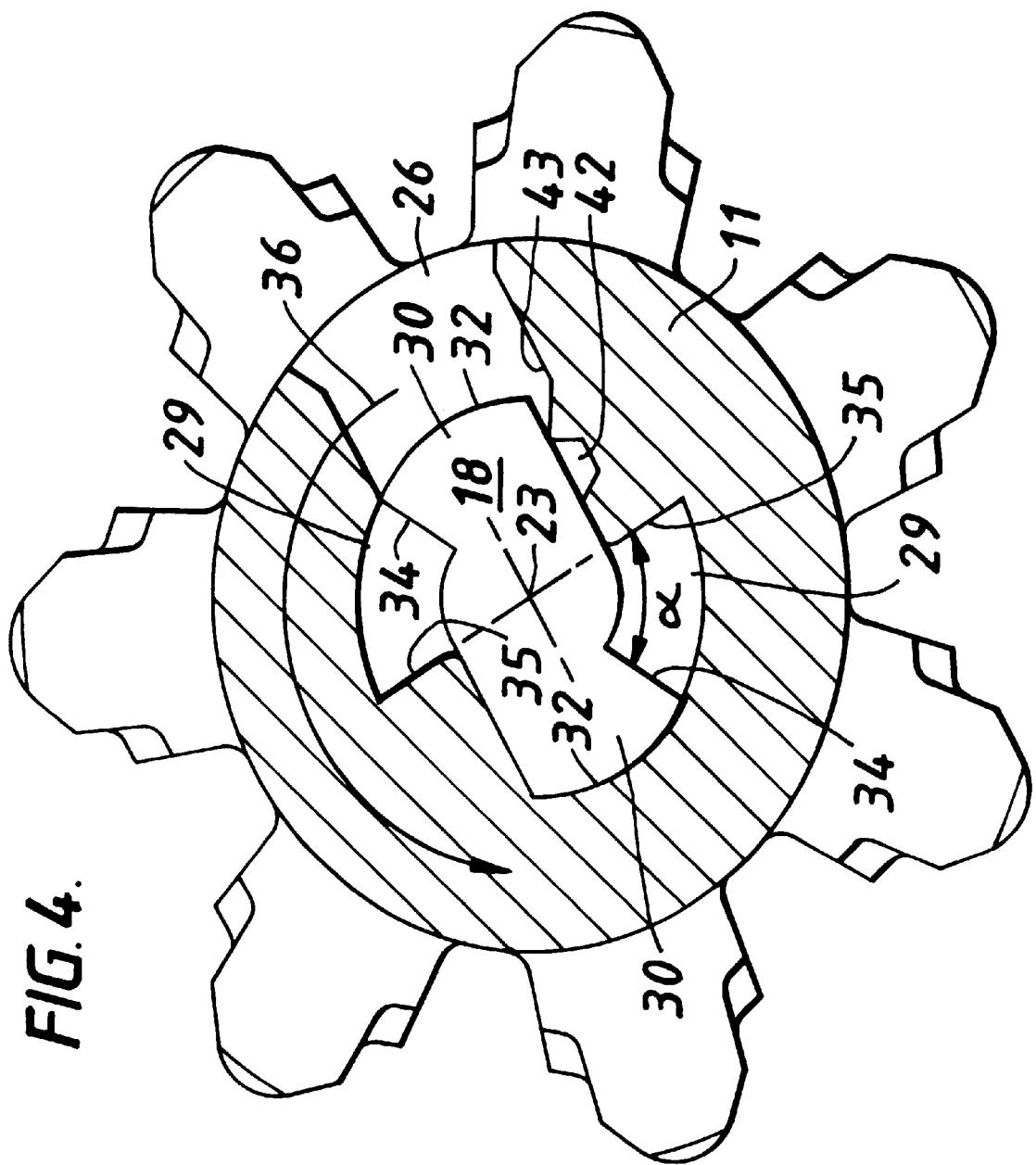

As shown in FIGS. 2 to 4, the plug-in elements 24 in the illustrated preferred embodiment of the invention take the form of pockets 25 each of which have a radial access opening 26. The depth of the pockets 25 is dimensioned such that the shaft journals 18 of the chain drum shafts 15, 16 can be received completely therein and the drum axis 23 and the axes of the drum shafts 15, 16 can be mutually aligned.

For effecting the positive connection between the chain drum 11 and drum shafts 15,16 the shaft journals 18 have flattened wall regions 27. The pockets 25 also form, in their basic shape 28 indicated by the broken lines in FIG. 3, groove-like slots each with a width which substantially corresponds to the width of the flattened region 27 of the associated shaft journal 18. In addition to this slot, each of the pockets 25 has two diametrically opposed undercut regions 29. The radially outer external regions 31 of the associated shaft journals 18 form locking claws 30 which fit into these undercut regions 29 after the chain drum 11 has been plugged completely onto the shaft journals 18 during assembly (FIG. 4) and rotated around a rotational angle of about 60° relative to the shaft journals 18. During this rotational movement, the curved external faces 32 of the shaft journals 18 first come into contact with the correspondingly curved external surfaces 33 of the approximately quadrant-shaped undercut regions 29 so that the centring of the chain drum 11 on the chain drum shafts 15,16 is ensured. As the chain drum 11 continues rotating on the shaft journals 18, contact faces 34 of the claws 30 extending radially to the axis 23, pass into contact with stop faces 35 of the undercut regions 29 which also extend radially, as shown best in FIG. 2.

The chain drum 11 is centred exactly on the chain drum shafts 15,16 and fixed positively at this stage of assembly and can be driven reliably in the direction of rotation indicated by the arrow 36 in FIG. 4 by the drum shafts 15, 16 without unintentional release of the drum 11 from the shaft journals 18. In order to prevent accidental release of the chain drum 11 from the shaft journals 18 in all operating states and under all conditions, which could occur, for example, if the conveyor were operated against its normal driving direction by only a comparatively short distance, the chain drum 11 is arrested on the shaft journals 18 with securing means 37. As shown in FIG. 2, the securing means 37 consists essentially of a shaped closure member 38 inserted into the radial opening 26 of one of the pockets 25 and a closure plate 40 connected thereto by a screw 39 and holding the closure member 38 in the pocket 25. Both journals 18 can be associated with such a securing means 37. The closure member 38 is provided with a locking projection 41 with which it engages in a groove 42 arranged in a lateral wall 43 of the pocket 25. To prevent the respective shaft journal 18 from rotating out of the position shown in FIG. 2, the closure member 38 possesses an inclined arresting face 44 which rests on one of the two parallel flattened surfaces 27 of the shaft journal 18 and biases it relative to the chain drum 11 via the contact and stop faces 34, 35.

The closure plate 40 prevents the associated closure member 38 from performing a tilting movement around the locking projection 41 from its locking position shown in FIG. 2. This tilting movement is necessary to remove the closure member 38 from the radial opening 26 again. For this purpose, the closure plate 40 is designed with a L-shaped angle profile 45 of which one arm 46 fits between the closure member 38 and the chain drum 11 and therefore rests, on the one hand, laterally on the closure member 38 and, on the other hand, on the lateral wall 43 of the pocket 25. The other second arm 47 of the plate 40 extends at right angles to the first arm 46 and is screwed by the screw 39 on the face of the closure member 38 which is accessible from the exterior.

It can be seen that, with the illustrated and described preferred embodiment of the invention, torque introduced into the chain drum 11 by the chain drum shafts 15, 16 is transmitted essentially via the contact and stop faces 34, 35, as indicated by the two arrows 48 in FIG. 2. The uniform distribution of the torque over the diametrically opposed contact and stop faces 34, 35, which do not have to absorb additional forces, ensures reliable, uniform running of the chain drum 11 and reduces wear of the drum shafts 15,16 in relation to the known arrangements and in particular wear of the shaft journals 18 and the bearings 17 of the shafts 15,16. Owing to the particularly advantageous design and method of fastening the securing means 37, neither the shaft journals 18 nor the chain drum 11 has to be provided with a thread for accepting the release screw 39, which would otherwise weaken the respective component and reduce its service life.

With the chain drum arrangement according to the invention, the drum 11 can be removed in a very short time by releasing the screws 39 and by removing the closure plates 40 and the closure members 38 from the openings 26 by tilting movement around the locking projections 41 and subsequently turning the drum 11 back about the rotational angle a against the normal driving direction 36 and removing it transversely to its longitudinal axis 23 from the journals 18 of the chain drum shafts 15, 16. The above-described steps are correspondingly reversed during assembly of the chain drum 11.

The invention is not restricted to the embodiment illustrated and described, but many variations and modifications are possible without departing from the scope of the invention. For example, it is conceivable to provide the pockets 25 not on the chain drum 11 but on the shaft journals 18. The plug-in elements are then formed on the chain drum 11 as projections extending axially from the end regions 19 with which they can be fixed and arrested in the pockets 25 on the shaft journals 18.

The securing of the drum 11 on the shaft journals 18 can obviously also be realized in a manner different from that described, for example by a securing element which is screwed on the drum 11 or on the shaft journal 18 itself or which is placed through a transverse bore through the drum 11 and the shaft journal 18.

What is claimed is:

1. A chain drum arrangement for a drive or reversing station of a scraper-chain conveyor, in particular for use in mining; said arrangement comprising a machine frame with side walls defining a space, a releasable chain drum disposed in the space, two mutually aligned chain drum shafts mounted rotatably in the machine frame and having terminal shaft journals projecting inwardly into the space to connect with end regions of the chain drum, the chain drum being capable of being installed into a fitted position operably coupled on the journals or removed from the fitted position by movement transversely to its longitudinal axis which is aligned with the axes of the shafts and their journals in the fitted position; wherein the chain drum is provided at its end regions with substantially radially extending plug-in elements with which it can be plugged onto the shaft journals and locked non-rotatably thereto.

2. A chain drum arrangement according to claim 1, wherein the plug-in elements are pockets which have radially accessible openings.

3. A chain drum arrangement according to claim 2, wherein the shaft journals are peripherally flattened to engage positively in the pocket.

4. A chain drum arrangement according to claim 3, wherein the pockets have undercut regions and the shaft journals have radially outer external regions forming locking claws which are adapted to fit in the undercut regions after partial rotation of the chain drum around the shaft journals about a rotational angle.

5. A chain drum arrangement according to claim 4, wherein the rotational angle is between 45° and 90°.

6. A chain drum arrangement according to claim 4, wherein the rotational angle is about 60°.

7. A chain drum arrangement according to claim 4, wherein the undercut regions have radially extending stop faces against which contact faces of the locking claws extending radially to the longitudinal axis of the chain drum rest after installing and rotation of the chain drum.

8. A chain drum arrangement according to claim 1, and further comprises securing means which locks or arrests the chain drum on the shaft journals.

9. A chain drum arrangement according to claim 8, wherein a separate securing means is provided for each shaft journal.

10. A chain drum arrangement according to claim 2 and further comprising securing means for locking the chain drum on the shaft journals in the fitted position the securing means comprising a closure member inserted into the radial opening of the associated pocket.

11. A chain drum arrangement according to claim 3 and further comprising securing means for locking the chain drum on the shaft journals in its fitted position, the securing means being insertable through the radially accessible openings to rest on the flattened regions of the respective shaft journal.

12. A chain drum arrangement according to claim 3, and further comprising securing means for locking the chain drum on the shaft journals in the fitted position the securing means comprising a closure member inserted into the radial opening of the associated pocket wherein the closure member is provided with a locking projection with which it engages in a groove in a lateral wall of the associated pocket and an arresting face of the closure member is adapted to rest on the flattened region of the associated shaft journal.

13. A chain drum arrangement according to claim 8, wherein the securing means is screwed on the shaft journal and/or on the chain drum in the locked position.

14. A chain drum arrangement according to claim 12, wherein the closure member is releasable by tilting around the locking projections and the closure member is secured in its locking position in the radial opening of the pocket by a screwed-on closure plate which prevents the tilting movement of the closure member.

15. A chain drum arrangement according to claim 14, wherein the closure plate is an L-shaped angle plate of which one arm rests laterally on the closure member and on the lateral wall of the pocket and of which the other arm is screwed to the radial exterior of the closure member.

16. A chain drum arrangement for use with a scraper-chain assembly for a scraper-chain conveyor, said arrangement comprising:

a chain drum with one or more toothed wheels for engaging with the scraper-chain assembly;

a pair of rotatable shafts with journals extending into the chain drum from opposite ends;

means for detachably connecting the chain drum to the journals and permitting the chain drum to be installed and removed from the arrangement by movement radially of the journals and part rotation relative to the journals in the manner of a bayonet fitting and selectively releasable means co-operating with the connecting means to prevent removal of the chain drum unless the releasable means has been operated and disabled.

* * * * *